United States Patent [19]
Suzuki

[11] Patent Number: 6,144,021
[45] Date of Patent: Nov. 7, 2000

[54] LEVEL HAVING AN AUTOFOCUS SYSTEM WITH CONTROLLABLE FOCUSING LENS GROUP

[75] Inventor: Shinichi Suzuki, Tokyo, Japan

[73] Assignee: Asahi Kogaku Kogyo Kabushiki Kaisha, Tokyo, Japan

[21] Appl. No.: 08/949,697

[22] Filed: Oct. 14, 1997

Related U.S. Application Data

[63] Continuation of application No. 08/625,883, Apr. 1, 1996, abandoned.

[30] Foreign Application Priority Data

Apr. 10, 1995 [JP] Japan ................................. 7-084230

[51] Int. Cl.[7] ..................................................... G01J 1/20
[52] U.S. Cl. ................................. 250/201.2; 250/201.8; 359/399
[58] Field of Search ........................... 250/201.2, 201.3, 250/201.4, 201.5, 201.8; 396/75, 77, 79, 80; 356/141.1, 141.2, 3.16; 359/399, 404, 410–412

[56] References Cited

U.S. PATENT DOCUMENTS 4,180,309 12/1979 Miyata et al. .
4,994,843 2/1991 Kitawa .
5,212,591 5/1993 Funathu ................................. 359/410
5,281,796 1/1994 Kaneda et al. ...................... 250/201.2
5,307,111 4/1994 Kurei .
5,327,192 7/1994 Sensui .
5,397,887 3/1995 Sensui ................................. 250/201.8

Primary Examiner—Que T. Le
Attorney, Agent, or Firm—Greenblum & Bernstein, P.L.C.

[57] ABSTRACT

A surveying apparatus, such as a level, includes an autofocus system. An object to be observed through a telescope of the surveying apparatus, is brought into focus through the autofocus system. The autofocus system includes a pair of image forming lenses, each forming an image of the object, and a pair of line sensors, each having a plurality of light receiving elements defining a light receiving area. The object images are respectively formed on the light receiving areas through the pair of image forming lenses. A focusing lens group is provided in the telescope. A mechanism moves the focusing lens group along an optical axis of the telescope in accordance with data output from the pair of line sensors. A device for detecting a position of the focusing lens group and a mechanism for selecting a number of the plurality of light receiving elements of each of the pair of line sensors to be used in a focusing operation are provided. The number of light receiving elements is selected depending on the position of the focusing lens group detected by the detecting device. A device is provided for controlling the moving mechanism in accordance with data output from the selected number of the plurality of light receiving elements.

12 Claims, 9 Drawing Sheets

LEVEL HAVING AN AUTOFOCUS SYSTEM WITH CONTROLLABLE FOCUSING LENS GROUP

This application is a continuation of application Ser. No. 08/625,883, filed Apr. 1, 1996, now abandoned.

BACKGROUND OF THE INVENTION

1. Field of the Invention

The present invention relates to a level including a telescope and a leveling device that is widely used in the construction fields and more specifically, to a level of the type having an autofocus system provided for the focusing optical system of the telescope through which a reference position of a subject is automatically brought into focus.

2. Description of the Related Art

A level is a piece of equipment generally used at a construction site by an engineer or surveyor for leveling, or for measuring bearings, horizontal angles, vertical angles, etc. The level is generally used with a tripod, the level being attached thereon.

One type of widely known level is the automatic level which is equipped with an automatic leveling instrument or device for automatically establishing a horizontal plane of sight.

The automatic level basically comprises a surveyor's telescope and a horizontal plane establishing optical system (horizontal plane compensating optical system) which functions as an automatic leveling device. The automatic level will now be explained.

When a reference position (sighting point that is set at a distance from the level), is sighted through the telescope, the horizontal plane establishing optical system ensures that a horizontal fine line of a reticle of the telescope lies on a real horizontal, even if the optical axis of the telescope is not correctly positioned in a horizontal plane. When another sighting point is sighted after the telescope has been rotated about the vertical axis, perpendicular to the optical axis thereof, the sighting point is located in the same horizontal plane as the reference position.

The optical system of the telescope of such an automatic level comprises an objective lens group, a focusing lens group and an eyepiece, arranged in this order from the object side. Due to the focusing lens group, a clear image of a sighted reference object (reference point) can be observed, regardless of the object distance. The position of the focusing lens group is adjusted depending on the object distance, so as to form a sharp object image on the reticle provided on the focal plane. The object image formed on the reticle can be viewed through the eyepiece.

Assuming that the observable object distance range of the surveyor's telescope is for example, 0.2 meters to ∞ (infinity), and that the focusing lens group is comprised of a concave lens, the movement range of the focusing lens group is approximately 30 mm. The focusing lens group is usually moved along the optical axis by rotating a rotatable focusing knob provided on the telescope. If the range of movement of the focusing lens group is small relative to the amount of rotation of the focusing knob, it is sometimes necessary to rotate the knob by a large amount to move the focusing lens group to a position at which an in-focus condition is obtained. That, it sometimes takes a long time to obtain an in-focus condition, although the image remains on the reticle on the focal plane for a long period of time. Conversely, if the range of movement of the focusing lens group is large relative to the rotation of the focusing knob, achieves proper focusing. However the focusing knob need not be rotated by a large amount the time in which the image remain on the reticle on the focal plane is too short with respect to the amount of rotation of the focusing knob. That is, the focusing lens group moves by a large amount even when the focusing knob is rotated by a small amount. It is therefore difficult to obtain an in-focus condition quickly since the focusing knob must be rotated step by step, resulting in a time consuming operation.

Furthermore, it is sometimes the case in the conventional automatic level that an in-focus condition is obtained by a slight rotation of the focusing knob when the object to be sighted is located far away, whereas a large amount of rotation of the focusing knob is required to obtain an in-focus condition when the object is located at a close distance. Still furthermore, since it is impossible for the naked eye to check whether the object to be sighted is in a front or rear focus state, the focusing knob is often firstly mistakenly rotated in a wrong direction, i.e., opposite to the direction needed for focusing. In any event, in the conventional automatic level, the focusing operation is troublesome and requires an extended period of time.

SUMMARY OF THE INVENTION

To eliminate the drawbacks of the conventional automatic level as mentioned above, it is an object of the present invention to provide an improved level having an autofocus system with which the time required to focus is shorter than the prior art and precise focusing can be achieved.

To achieve the objects mentioned above, according to the present invention, there is provided a level having an autofocus system through which an object to be observed through a telescope of the level is brought into focus. The autofocus system includes a pair of image forming lenses, each of which forms an image of the object, and a pair of line sensors, each having a plurality of light receiving elements defining a light receiving area, with the object images being respectively formed on the light receiving areas through the pair of image forming lenses. A focusing lens group is provided in the telescope, and a device moves the focusing lens group along an optical axis of the telescope in accordance with data output from the pair of line sensors. A device detects a position of the focusing lens group. A mechanism selects a number of the plurality of light receiving elements of each of the pair of line sensors to be used in a focusing operations. The number of light receiving elements selected depends on the position of the focusing lens group detected by the detecting device. A mechanism controls the moving device in accordance with data output from the selected number of the plurality of light receiving elements.

With this structure, not only can the time required to focus the telescope on an object be shortened by the autofocus system, but precise focusing is also achieved since the number of the plurality of light receiving elements of each of the pair of line sensors used in a focusing operation is selected depending on the position of the focusing lens group detected by the detecting device. If the number of the light receiving elements of each of the pair of line sensors in a focusing operation is fixed (i.e., if the size of a focus measuring area, determined by the light receiving area to be used on each line sensor, is always the same) the percentage of the area of the object image to be focused with respect to the focus measuring area decreases as the object distance increases. The smaller the percentage of the area of the object image to be focused with respect to the focus measuring area is, the higher the chances are that a focusing error will occur due to a disturbance of light and the like. However, according to the present invention, the influence of disturbance of light on the pair of line sensors can be effectively reduced at any object distance due to the structure of the present invention. The number of the plurality of light receiving elements of each of the pair of line sensors used in a focusing operation is thus selected depending on the position of the focusing lens group detected by the detecting device, whereby precise focusing is achieved.

Preferably, the number of light receiving elements selected by the selecting mechanism decreases as a distance of the object to be observed increases, and the object distance is detected from the position of the focusing lens group.

Preferably, the telescope includes an objective lens group, the focusing lens group, a beam splitter, a reticle and an eyepiece in this order from the side of the object to be observed. A part of the light passing through the objective lens group and the focusing lens group is reflected by the beam splitter towards the pair of image forming lenses and is subsequently split into two split images. The two split images are respectively formed on the pair of line sensors through the pair of image forming lenses.

Preferably, the autofocus system further includes a condenser lens positioned between the beam splitter and the pair of image forming lenses.

Preferably, the autofocus system further includes a device for storing a plurality of sets of effective area defining data where each set defines a different number of light receiving elements to be used. Thus depending upon the position of the focusing lens group as detected by the detecting device, one set of the plurality sets of effective area defining data is input to the selecting mechanism. The selecting mechanism selects the number of the plurality of light receiving elements in accordance with the selected set of effective area defining data.

Preferably, the telescope further includes a horizontal plane establishing optical system positioned between the focusing lens group and the beam splitter for automatically establishing a horizontal plane of sight.

Preferably, the telescope further includes an AF frame formed on a transparent plate positioned in an optical path of the telescope. The AF frame indicates a focus measuring area corresponding to each of the light receiving areas.

Preferably, the transparent plate is an LCD plate indicating the AF frame. The AF frame varies in size, depending on the number of light receiving elements selected by the selecting mechanism.

Preferably, the AF frame varies in size to correspond to the size of each of the light receiving areas such that the size of the AF frame decreases as a distance of the object to be observed increases, the object distance being detected from the position of the focusing lens group.

Preferably, each of the pair of line sensors is a multi-segment CCD sensor having a plurality of photodiodes serving as the plurality of light receiving elements.

The selecting mechanism and the controlling mechanism may be provided in a single CPU.

According to another aspect of the present invention, there is provided a level having an autofocus system through which an object to be observed through a telescope of the level is brought into focus. The telescope includes (in order from the object side) an objective lens group, a focusing lens group, a reticle and an eyepiece. The focusing lens group moves along an optical axis to form an object image of the object on the reticle. The object image formed on the reticle is observed through the eyepiece. A beam splitter is provided in an optical path between the focusing lens group and the reticle. A pair of image forming lenses each form an object image. The pair of image forming lenses each receiving light emitted from the beam splitter; A pair of line sensors, each having an array of light receiving elements, define a light receiving area. The object images are being respectively formed on the light receiving areas through the pair of image forming lenses. A device moves the focusing lens group along the optical axis in accordance with data output from the pair of line sensors. A device detects a position of the focusing lens group. A mechanism selects, from the array on each of the pair of line sensors, at least some of the light receiving elements to be used in a focusing operation in which the moving device moves the focusing lens group so as to form the object image of the object on the reticle, depending on the position of the focusing lens group detected by the detecting device. A mechanism controls the moving device in accordance with data output from the selected light receiving elements.

The present disclosure relates to subject matter contained in Japanese Patent Application No. 7-84230 (filed on Apr. 10, 1995) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
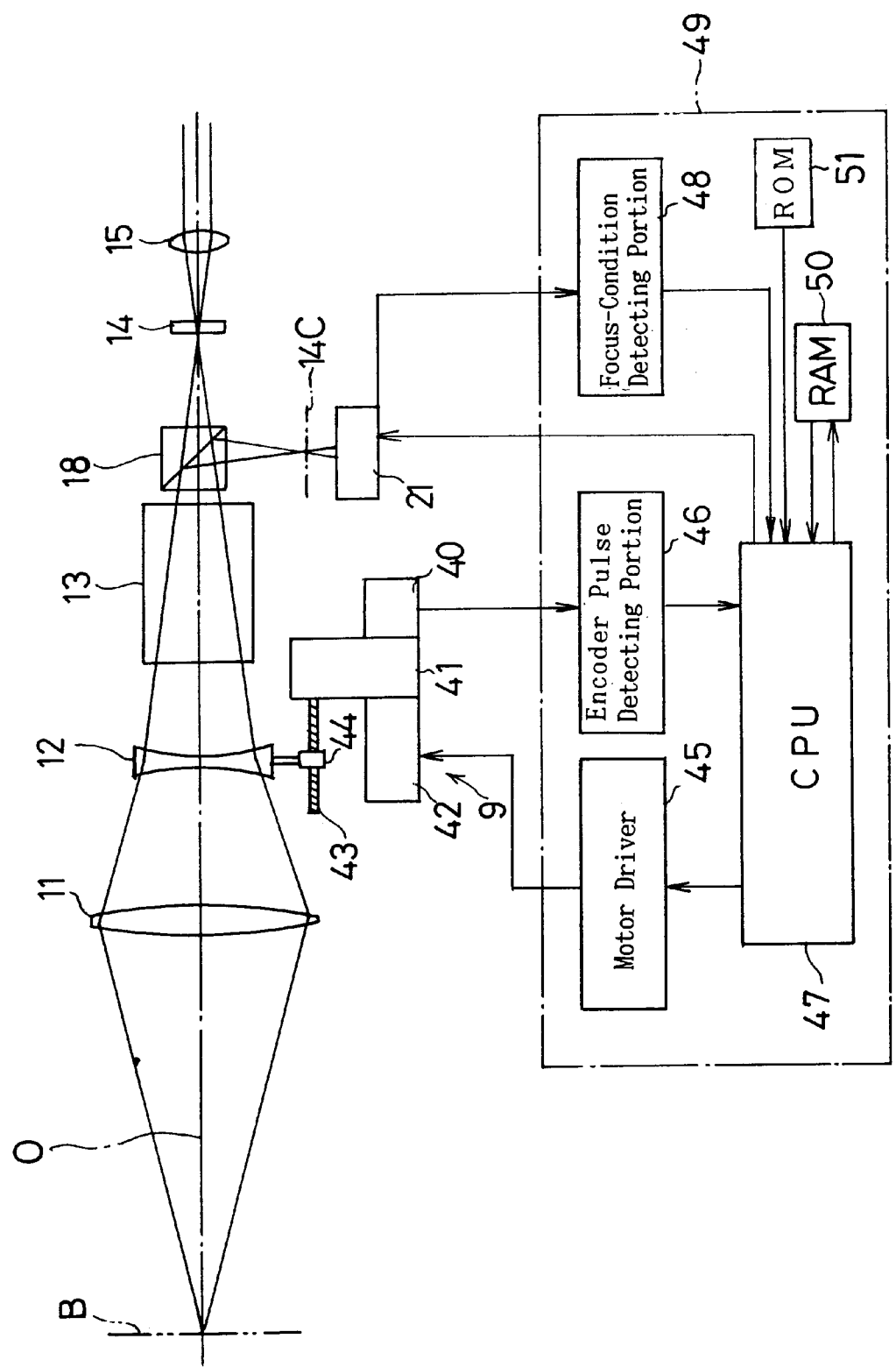
FIG. 1 is a conceptual view of an embodiment of an automatic level to which the present invention is applied.
Figure 8:
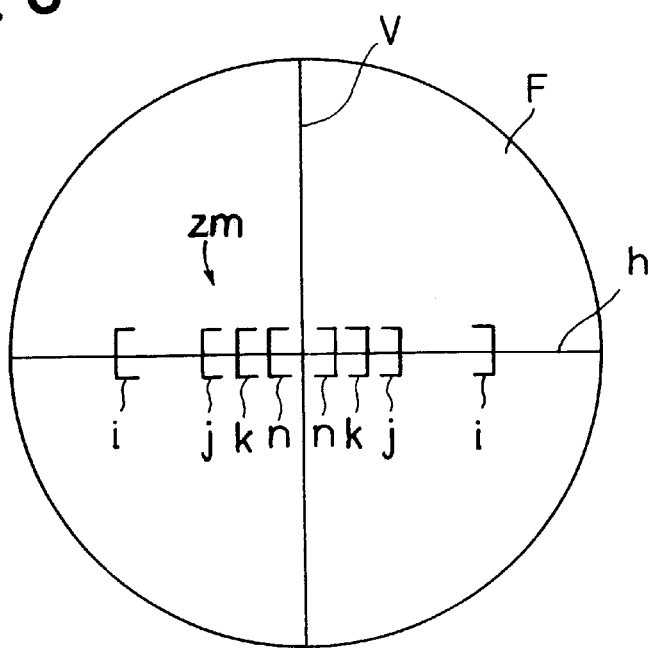
FIG. 8 shows a telescope view having pairs of brackets, of the pairs being activated to form an AF frame defining a distance measuring area.
Figure 9:
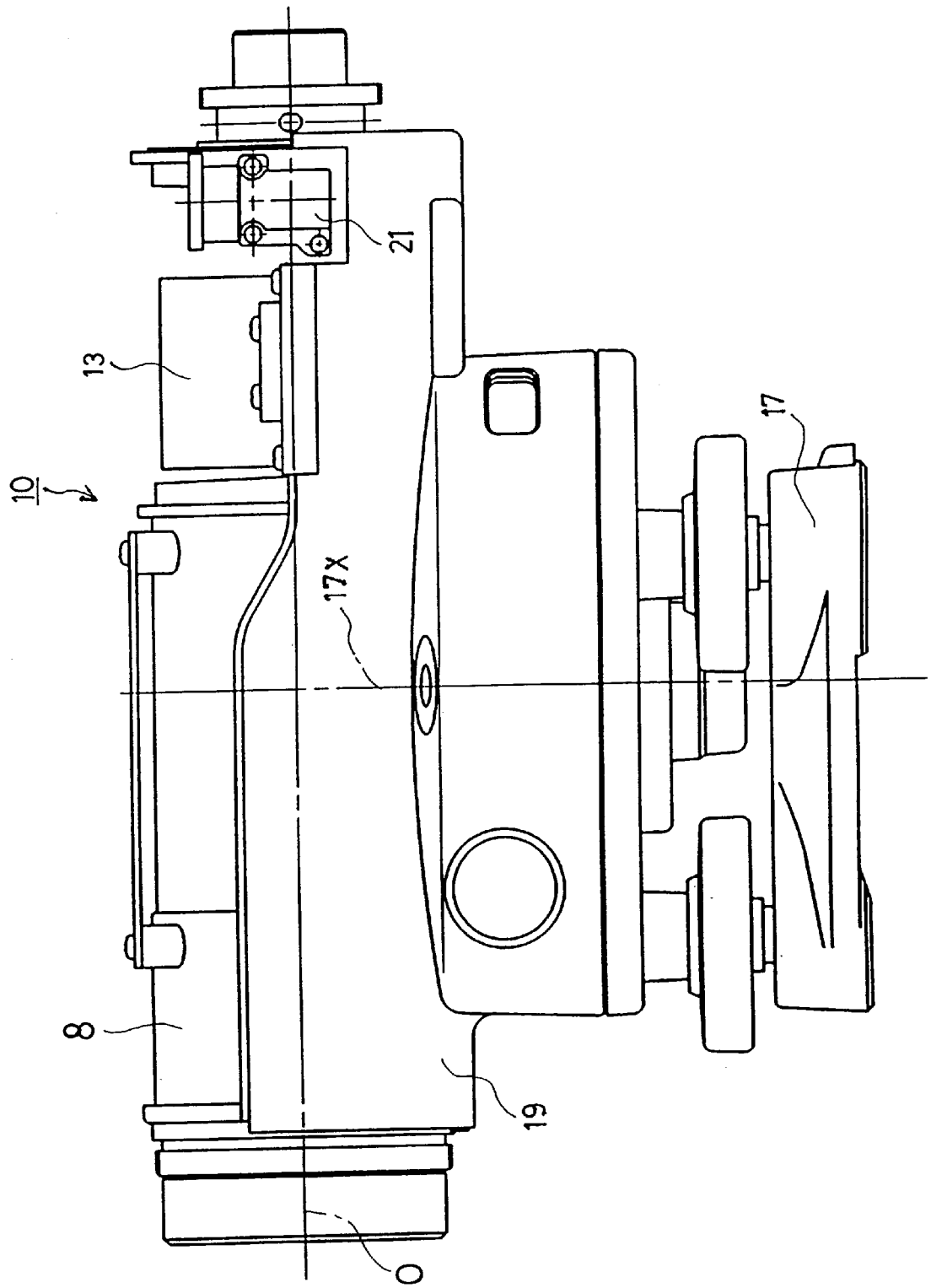
FIG. 9 is a side elevational view of the embodiment of the automatic level shown in FIG. 1.
Figure 10:
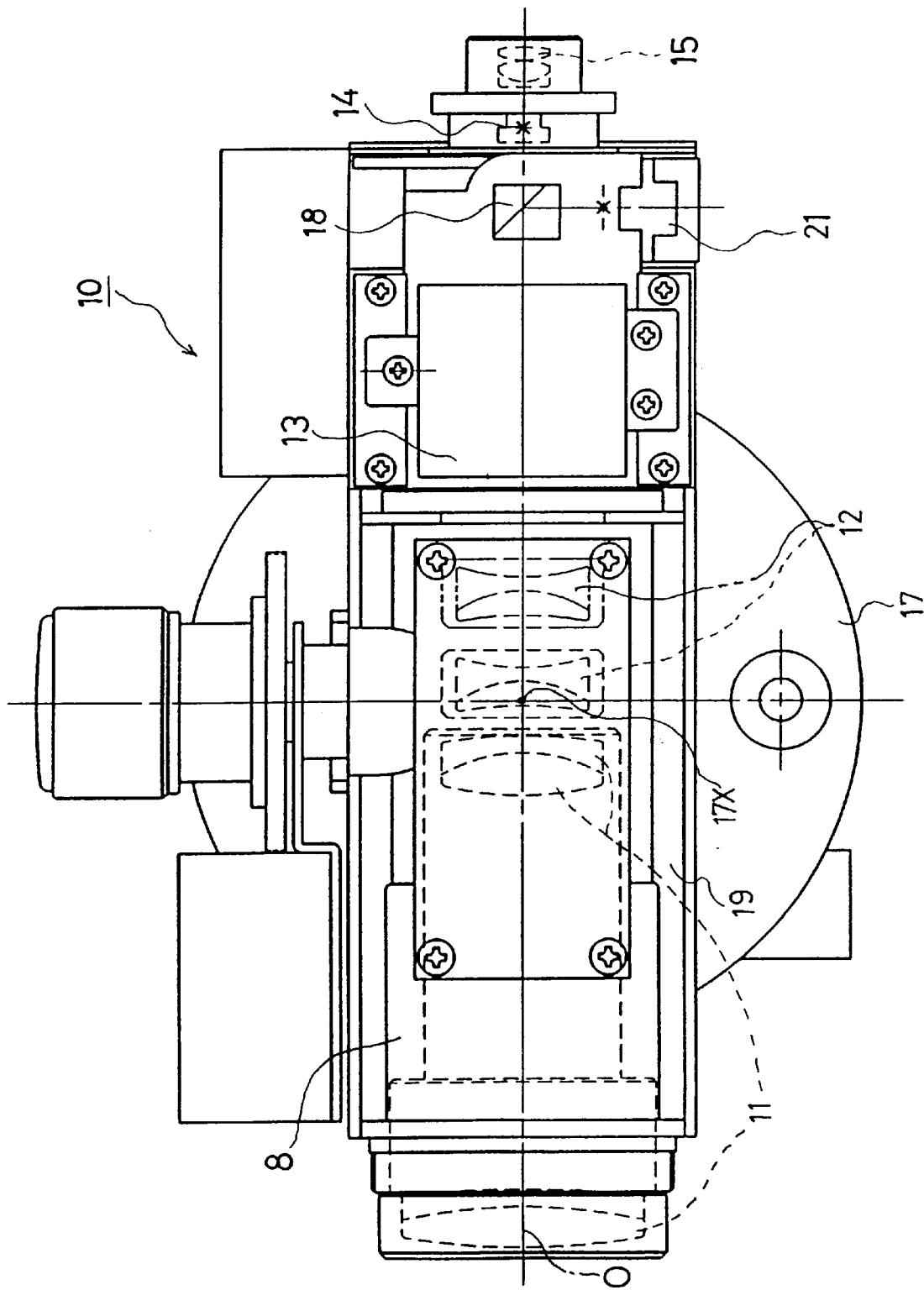
FIG. 10 is a plan view of the embodiment of the automatic level shown in FIG. 9.

FIGS. 9 and 10 show an embodiment of an automatic level 10 to which the present invention is applied. The automatic level 10 is provided with a surveyor's telescope 8 including an objective lens group 11 of positive power, a focusing lens 12 of negative power, a horizontal plane establishing optical system 13, a beam splitter (semitransparent mirror) 18, a reticle plate 14, and an eyepiece lens 15 of positive power, in this order from the object side (i.e., left to right in FIGS. 1, 9 or 10). For purposes of illustration the objective lens group 11 is drawn as a single lens in FIG. 1, although the objective lens group 11 is actually comprised of a plurality of lenses as shown in FIG. 10. On the reticle plate 14, a reticle is visibly formed thereon. The reticle consists of a fine horizontal line h and a fine vertical line v (see FIG. 8) intersecting perpendicular to each other.

Figure 11:
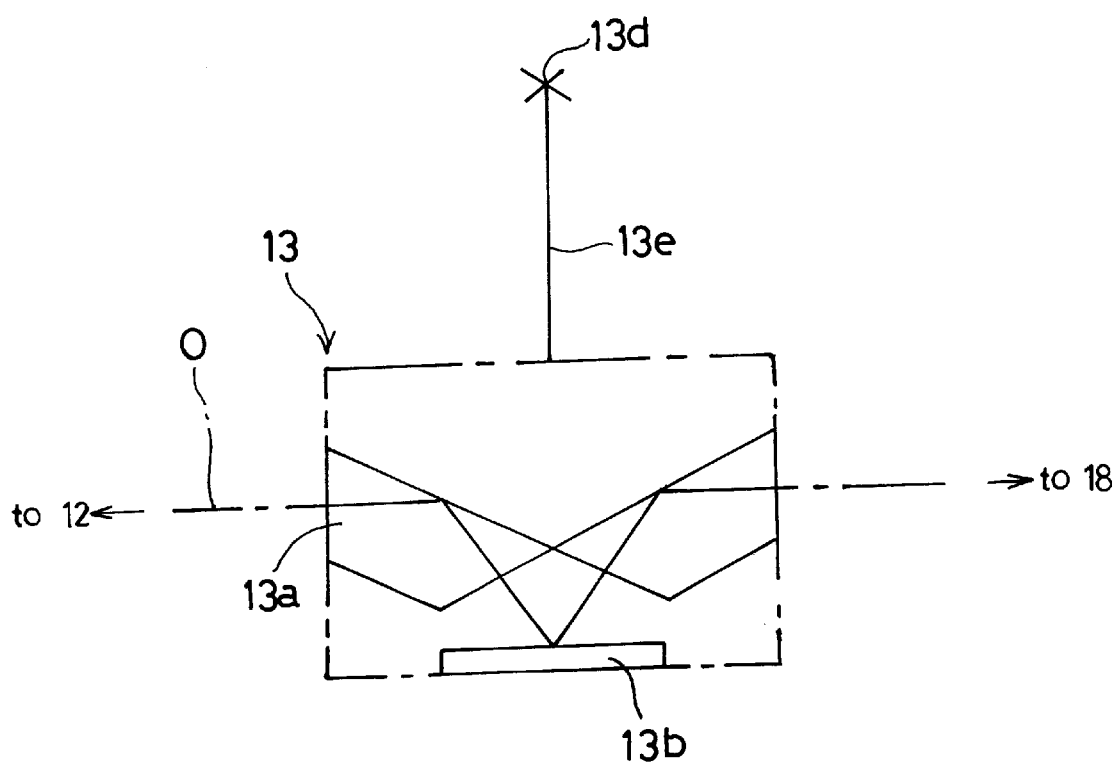
FIG. 11 is a schematic view of a horizontal plane establishing optical system in the automatic level shown in FIGS. 9 and 10.

The horizontal plane establishing optical system 13, per se known, is provided, as shown in FIG. 11, with a first compensating prism 13a, a compensating mirror 13b and a second compensating prism 13c, and has a symmetrical shape with respect to the center of the compensating mirror 13b. The horizontal plane establishing optical system 13 hangs from a string 13e attached to a shaft 13d.

The telescope 8 of the automatic level 10 is supported on a supporting frame 19 fixed on a rotatable table 17. The rotatable table 17 is rotatable about a vertical axis 17X, which is perpendicular to the optical axis O of the telescope. Objects located at different distances from the automatic level 10, but located on a common horizontal plane, can be observed through the telescope 8.

The magnification of the telescope 8 (having the above-mentioned optical elements) of the automatic level 10, is set, e.g., at twenty-four times (×24). The rotatable table 17 is detachably attached to a tripod (not shown) when the automatic level 10 is used. A reference pole B (see FIGS. 3 to 7) on which a scale is printed, is often used as an object to be sighted by the automatic level 10. The bottom end of the reference pole B is placed on a reference point on the ground, while the top end is generally held by a person.

The automatic level 10 is provided with a focusing lens drive mechanism 9 for moving the focusing lens 12 along the optical axis O for focusing. The focusing lens drive mechanism 9 (FIG. 1) includes a lens drive motor 42, a clutch-incorporated speed reduction mechanism 41, a nut 44 and an encoder 40. The lens drive motor 42 may be a stepping motor. The clutch-incorporated speed reduction mechanism 41 transmits the rotation of the lens drive motor 42 to a screw shaft 43. The nut 44 is fixed to the focusing lens 12 and is engaged with the screw shaft 43. Therefore, when the screw shaft 43 rotates the focusing lens 12 moves along the optical axis O. The encoder 40 outputs lens positional information in the form of pulse signals, the number of which corresponds to the amount of rotation of the screw shaft 43.

A part of the light emitted from the horizontal plane establishing optical system 13 is reflected by the beam splitter 18 at a right angle towards a focus detecting sensor 21 provided near the beam splitter 18. Between the beam splitter 18 and the focus detecting sensor 21, an imaginary equivalent surface 14C is formed and located at a position optically equivalent to the position at which the reticle plate 14 is placed. The focus detecting sensor 21 receives light reflected by the beam splitter 18 and outputs corresponding signals to a focus-condition detecting portion 48.

The automatic level 10 is provided with an AF controller 49 which includes a CPU 47, a motor driver 45, an encoder pulse detecting portion 46, the focus-condition detecting portion 48 (mentioned above), a RAM 50 and a ROM 51.

Figure 2:
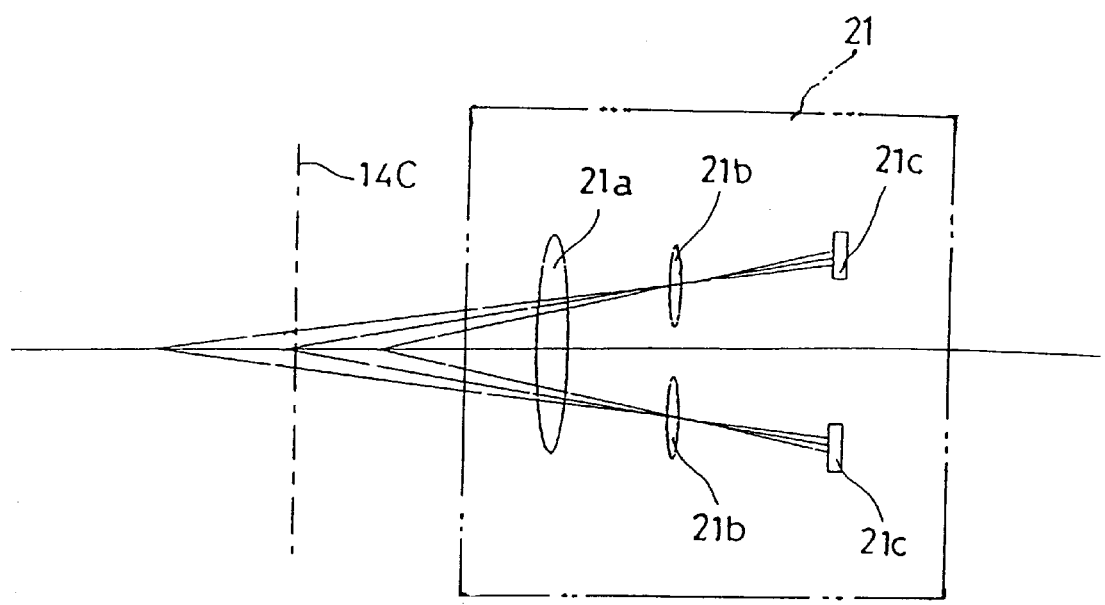
FIG. 2 is a conceptual view of a focus detecting optical system.

The focus condition on the equivalent surface 14C is detected by the focus-condition detecting portion 48 in accordance with the signals received from the focus detecting sensor 21. The principle of the focus detecting sensor 21 will now be discussed with reference to FIG. 2.

The focus detecting sensor 21 consists of a condenser lens 21a, a pair of separating lenses 21b and a pair of line sensors 21c. The pair of line sensors 21c are located in the vicinity of the equivalent surface 14C for receiving light emitted from the beam splitter 18. Each line sensor 21c is a multi-segment CCD sensor having an array of photodiodes (i.e., a plurality of light receiving elements). The pair of line sensors 21c are aligned horizontally, i.e., along a horizontal plane perpendicular to the reference pole B.

Figure 3:
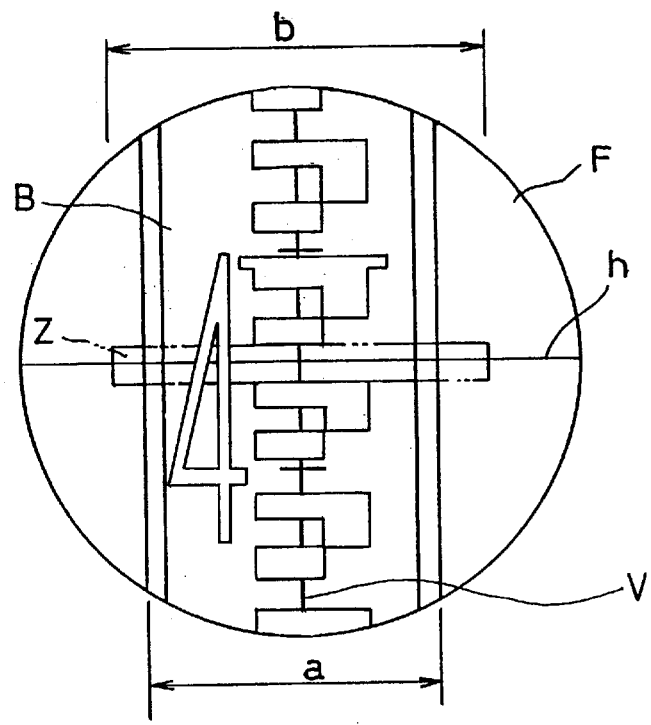
FIG. 3 shows a telescope view in the case where a reference pole located at a distance of five meters from the automatic level is observed.
Figure 4:
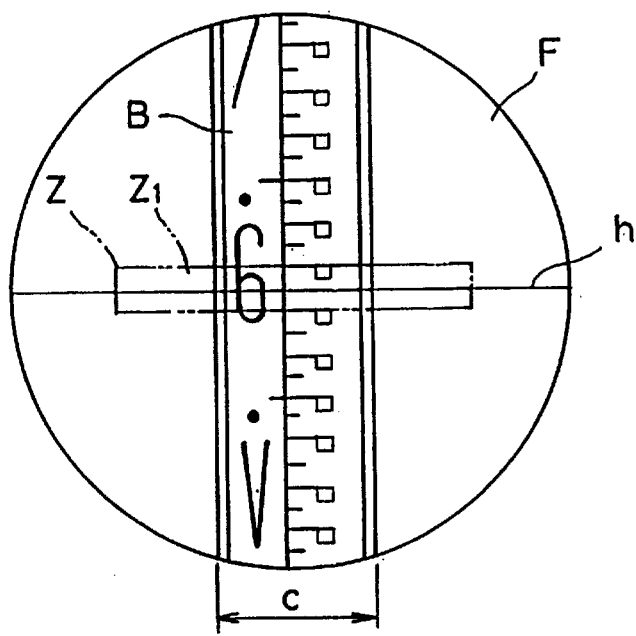
FIG. 4 shows a telescope view in the case where the reference pole located at a distance of 10 meters from the automatic level is observed.
Figure 5:
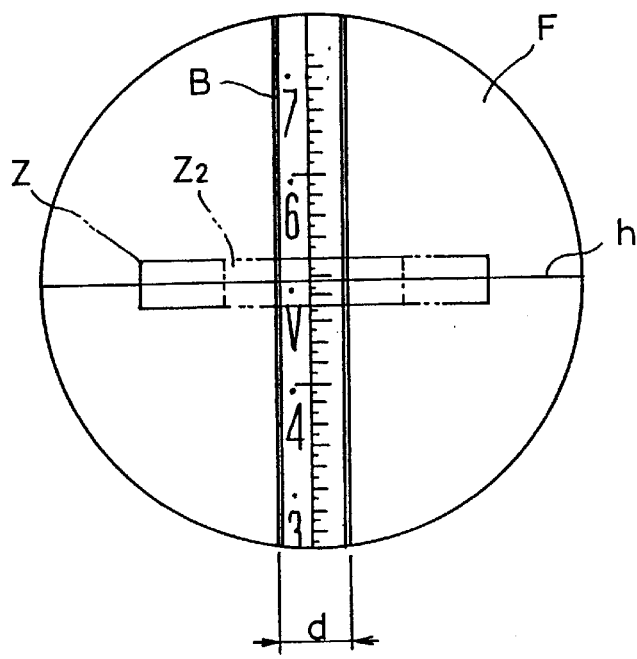
FIG. 5 shows a telescope view in the case where the reference pole located at a distance of 20 meters from the automatic level is observed.
Figure 6:
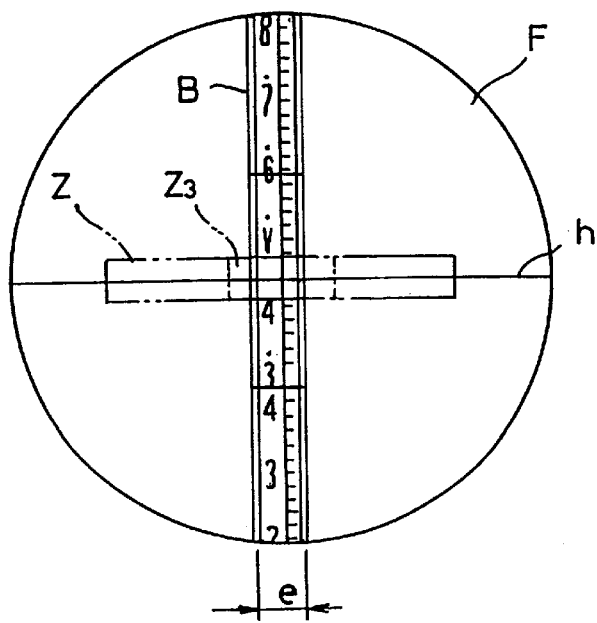
FIG. 6 is a telescope view in the case where the reference pole located at a distance of 30 meters from the automatic level is observed.
Figure 7:
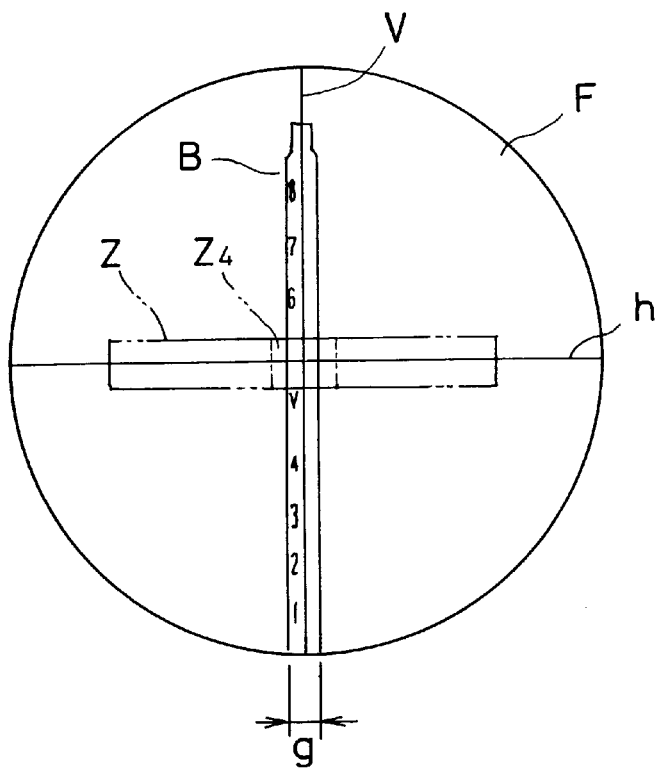
FIG. 7 shows a telescope view in the case where the reference pole located at a distance of 50 meters from the automatic level is observed.

A common object image (e.g., the object image such as shown in a focus measuring area Z shown in FIG. 3) is incident on each of the pair of line sensors 21c. Relative locations of the two object images on the pair of line sensors 21c change depending upon the position of the focusing lens 12, that is, the location of the focal point relative to the equivalent surface 14C. Namely, relative locations of the two object images on the pair of line sensors 21c change in the following three cases: (a) when the focal point of the object image is located precisely on the equivalent plane 14C (i.e., in-focus condition), (b) when the focal point of the object image is located between the beam splitter 18 and the equivalent surface 14C (i.e., front focus condition), and (c) when the focal point of the object image is located between the equivalent surface 14C and the focus detecting sensor 21 (i.e., rear focus condition). Through the focusing detecting sensor 21 the location of the focal point, i.e., in-focus, front focus or rear focus can be detected.

The defocus amount can also be detected through the pair of line sensors 21c by detecting the position on each line sensor 21c at which the corresponding object image is formed through the condenser lens 21a and the corresponding separating lens 21b. When the focus-condition detecting portion 48 receives sensor signals output from each line sensor 21c, the focus-condition detecting portion 48 amplifies the output sensor signals through an amplifier (not shown) provided in the focus-condition detecting portion 48. Subsequently, it inputs the amplified output sensor signals to an operation circuit (not shown) provided in the focus-condition detecting portion 48 so as to detect an in-focus, a front focus or a rear focus condition, and the amount of defocus. The focus-condition detecting portion 48 outputs the detected condition and defocus amount to the CPU 47.

When the reference pole B is placed at a location spaced from the automatic level 10 by five meters (considered to be near to the automatic level 10), the reference pole B observed through the telescope 8 of the automatic level 10 will appear in the telescope view F as shown in FIG. 3. In this state, since the image of the reference pole B occupies almost the whole of the telescope view F with respect to the background, the chance of a focusing error, due to a disturbance of light and the like, is minimal.

In FIG. 3, "a" represents the width of the image of the reference pole B on the equivalent surface 14C. In this particular embodiment of the present invention, the actual width of the reference pole B is 70 mm, and the width "a" of the image thereof on the equivalent surface 14C is 3.3 mm. "b" represents the width of the focus measuring area Z corresponding to the light receiving area of each line sensor 21c. The width "b" is 4 mm in this embodiment. The focus measuring area Z is indicated in the telescope view F by an AF frame zm (see FIG. 8) consisting of pairs of brackets n, k, j or i. These pairs of brackets n, k, j and i may be formed as ON/OFF segments on an LCD plate provided in the optical path of the telescope 8 (and in the vicinity of the reticle plate 14), and one of the pairs of brackets is activated (i.e., turned ON) to be visible depending upon the detected distance of an object to be observed. "h" and "v" respectively designate the fine horizontal line and the fine vertical line of the reticle formed on the reticle plate 14. Each fine line has a thickness of 0.003 mm.

The farther the reference pole B is located from the automatic level 10, the smaller the image of the reference pole B, observed in the telescope view F, becomes. More specifically, when the reference pole B is spaced from the automatic level 10 by 10 m, 20 m, 30 m and 50 m, the widths of the images of the reference pole B on the equivalent surface 14C become "c", "d", "e" and "g" respectively, as shown in FIGS. 4, 5, 6 and 7. The widths "c", "d", "e" and "g" are approximately 1.6 mm, 0.8 mm, 0.6 mm and 0.3 mm, respectively, in this embodiment.

If the width of the focus measuring area Z is constant, as the reference pole B moves away from the automatic level 10, the ratio of the area occupied by the image of the reference pole B to the size of the focus measuring area Z gradually decreases, whereas the ratio of the background to the focus measuring area Z increases. Concrete data showing these variations are shown in the following table.

The data in the following table shows the case where the magnification of the telescope 8 of the automatic level 10 is twenty-four times (×24), the diameter of the telescope view F on the reticle plate 14 is approximately 6 mm, the width of the light receiving area of each line sensor 21c (i.e., the width of the focus measuring area Z) is 4 mm, the composite focal length of the objective lens group 11 and the focusing lens 12 is approximately 240 mm, and the width of the reference pole B is 70 mm.

In the table below "Distance" represents the distance from the automatic level 10 to the reference pole B, "Image Size" represents the width of the image of the reference pole B on the equivalent surface 14C, "Image Size/Telescope view" represents the percentage of the telescope view F occupied by the image of the reference pole B, and "Image Size/Sensor Detecting Area" represents the percentage of the focus measuring area Z occupied by the image of the reference pole B.

TABLE

| Distance (m) | Image Size (mm) | Image Size/ Telescope view (%) | Image Size/Sensor Detecting Area (%) |
| --- | --- | --- | --- |
| 3 | 5.5 | 93 | 138 |
| 5 | 3.3 | 56 | 82 |
| 10 | 1.65 | 28 | 41 |
| 20 | 0.83 | 14 | 21 |
| 30 | 0.55 | 9 | 14 |
| 50 | 0.33 | 6 | 8 |

It will be appreciated from the above table that the percentage of space that the image of the reference pole B take up of the focus measuring area Z becomes very small when the distance between the automatic level 10 and the reference pole B exceeds 10 meters. The smaller the percentage of the image of the reference pole B with respect to the focus measuring area Z is, the higher the chances are that a focusing error occurs due to the disturbance of light and the like.

The magnification of an eyepiece is defined by the following formula:

$$M = Ld/Fe$$

wherein
"M" represents the magnification;
"Ld" represents the least distance of distinct vision (generally 250 mm); and
"Fe" represents the focal length of the eyepiece.

If the focal length of the eyepiece 15 is 9.6 mm, the magnification of the eyepiece 15 is twenty-six times (×26), i.e., 250(mm)÷9.6(mm)=26. Thus, the image of the reference pole B is observed through the eyepiece 15 with the size of the image on the equivalent surface 14C being magnified twenty-six times.

In order to overcome the aforementioned drawbacks, according to the automatic level 10 to which the present invention is applied, the width of the focus measuring area Z, i.e., the width of the light receiving area to be used on each line sensor 21c, is varied depending on the object distance. This is the main feature of the present invention.

The CPU 47 outputs drive signals to the lens drive motor 42 through the motor driver 45 in accordance with the focus condition information and defocus amount information received from the focus-condition detecting portion 48. This activates the lens drive motor 42 to move the focusing lens 12 in the direction where the object image, formed on the equivalent surface 14C, is brought into focus. The encoder 40 outputs a corresponding number of pulse signals in accordance with the amount of rotation of the lens drive motor 42, and the outputted pulse signals are sent to the encoder pulse detecting portion 46. The encoder pulse detecting portion 46 detects the position of the focusing lens 12 from the number of pulse signals received from the encoder 40, and subsequently, sends the CPU 47 a signal indicating the object distance at which the observed object image is focused on the equivalent surface 14C or the reticle plate 14.

Figure 12:
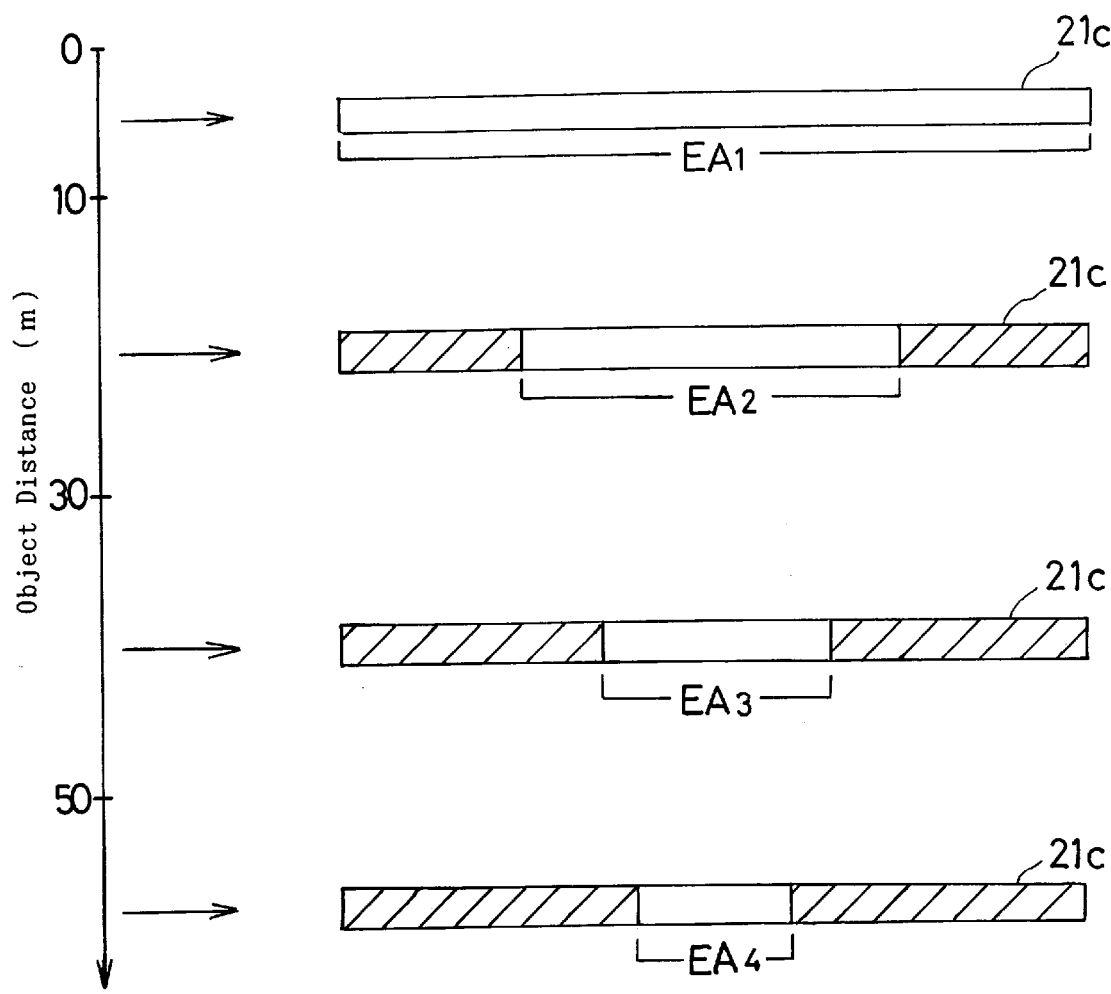
FIG. 12 is a conceptual view illustrating how the light receiving area to be used on each line sensor is varied depending upon the variation in detected object distance.

The CPU 47 varies the width of the light receiving area to be used on each line sensor 21c by actuating only a predetermined number of photodiodes from all the photodiodes of each line sensor 21c, in accordance with the effective area defining data read out from the RAM 50. Four sets of predetermined effective area defining data, i.e., first, second, third and fourth effective area defining data, are predetermined and stored in the ROM 51. The light receiving area to be used on each line sensor 21c is correspondingly varied as one of four predetermined areas $EA_1$, $EA_2$, $EA_3$ and $EA_4$ (FIG. 12), in accordance with the first, second, third and fourth effective area defining data, respectively. The four predetermined areas $EA_1$, $EA_2$, $EA_3$ and $EA_4$ respectively correspond to first, second, third and fourth focus measuring areas $Z_1$, $Z_2$, $Z_3$ and $Z_4$ (FIGS. 4, 5, 6 and 7). The oblique-lined portion on each line sensor 21c shows the non-used area where the photodiodes provided therein are not actuated in the focusing operation.

The above-noted first through fourth effective area defining data are predetermined to correspond to the respective four divided sections of the object distance range (e.g., from zero meters to 50 meters or more) within which the encoder pulse detecting portion 46 can detect an object distance. One of the first through fourth effective area defining data is read out from the ROM 51 and stored in the RAM 50 in accordance with the above mentioned signal, indicating the object distance that is received from the encoder pulse detecting portion 46. In accordance with that effective area defining data stored in the RAM 50, the CPU 47 varies the width of the light receiving area to be used on each line sensor 21c.

When the object distance, detected through the encoder pulse detecting portion 46, is equal to or less than 10 meters, the first effective area defining data is stored in the RAM 50, and the entire light receiving area (the light receiving area $EA_1$ in FIG. 12) is used for the focusing operation. At the same time, the corresponding pair of visible brackets i are activated to be visible as the AF frame zm.

When the object distance detected through the encoder pulse detecting portion 46 is greater than 10 meters but less than 30 meters, the second effective area defining data is stored in the RAM 50, and 50 percent (i.e., 25 percent on each side of the center) of the entire light receiving area ($EA_2$ in FIG. 12) is used for the focusing operation. At the same time, the corresponding pair of visible brackets j are activated as the AF frame zm.

When the object distance detected through the encoder pulse detecting portion 46 is greater than or equal to 30 meters but less than 50 meters, the third effective area defining data is stored in the RAM 50. Thirty percent (i.e., 15 percent on each side of the center) of the entire light receiving area ($EA_3$ in FIG. 12) is used for the focusing operation. At the same time, the corresponding pair of visible brackets k are activated as the AF frame zm.

When the object distance detected through the encoder pulse detecting portion 46 is greater than or equal to 50 meters, the fourth effective area defining data is stored in the RAM 50. Twenty percent (i.e., 10 percent on each side of the center) of the entire light receiving area ($EA_4$ in FIG. 12) is used for the focusing operation. At the same time, the corresponding pair of visible brackets n are activated as the AF frame zm.

It will be appreciated from the foregoing that the farther the object to be focused is located from the automatic level 10, the narrower the focus measuring area Z, determined by the light receiving area to be used on each line sensor 21c, is set. Since the focus measuring area Z, i.e., the light receiving area to be used on each line sensor 21c, is narrowed or enlarged depending upon the distance of the object to be sighted (e.g., the reference pole B) from the automatic level 10, the chances that a focusing error will occur due to the disturbance of light and the like is greatly reduced; i.e., the percentage of the size of the image of the object to be sighted with respect to the focus measuring area Z is always high.

It is noted that the width of the focus measuring area Z cannot be narrower than a certain width. This will be understood from the following.

When the telescope 8 of the automatic level 10 is directed to the reference pole B, since this directing operation is performed by manually swinging the telescope 8, (the telescope 8 being hand-held) the automatic level 10 shakes to some degree. This makes it difficult to precisely place the image of the reference pole B in the middle of the focus measuring area Z indicated by the AF frame zm. In other words, it would be quite difficult and consume too much time to place the image of the reference pole B in the middle of the AF frame zm in the case where the AF frame zm is too small. The same thing can also be said in the case where the width of the narrowed AF frame zm is identical to that of the observed image of the reference pole B. The minimum width of the focus measuring area corresponds to approximately 15 to 30 degrees in the angle of view of the telescope 8 of the automatic level 10.

The image of the reference pole B can be autofocused on the equivalent surface 14C through the objective lens group 11, the focusing lens 12, the horizontal plane establishing optical system 13 and the beam splitter 18. In this state, even if the optical axis O of the telescope 8 of the automatic level 10 does not precisely lie on a horizontal plane, the fine horizontal line h on the reticle plate 14 is automatically adjusted to lie substantially horizontal by the horizontal plane establishing optical system 13. Therefore, when another sighting point is located after the telescope 8 has been rotated about the vertical axis 17X, the sighting point is located in the horizontal plane including the initially sighted reference position.

When the object light, reflected on the beam splitter 18 and passed through the equivalent surface 14C, is incident upon the focus detecting sensor 21, the focus-condition detecting portion 48 calculates the defocus amount for the image of the reference pole B in accordance with the signals output from the pair of line sensors 21c. This detects the focus condition for the reference pole B, i.e., whether the reference pole B is in an in-focus, out-of-focus, front-focus or rear-focus condition. The result of this detection is input to the CPU 47, and subsequently, the CPU 47 outputs lens drive signals to the focusing lens drive mechanism 9 through the motor driver 45 to actuate the lens drive motor 42, so that the focusing lens 12 moves along the optical axis O through the screw shaft 43 and the nut 44. During movement of the focusing lens 12, the encoder pulse detecting portion 46 continues to feed the position of the focusing lens 12 back to the CPU 47 in accordance with the pulse signals received from the encoder 40. The CPU 47 controls the lens drive motor 42 to stop the focusing lens 12 at a position where the image of the reference pole B is in-focus on the equivalent surface 14C.

When the reference pole B is brought into focus, the CPU 47 activates one of the pairs of brackets i, j, k and n as the AF frame zm. Only the pair of brackets i are turned ON when the detected object distance of the reference pole B is less than or equal to 10 meters. Only the pair of brackets j are activated when the detected object distance of the reference pole B is more than 10 meters but less than 30 meters. Only the pair of brackets k are activated when the detected object distance of the reference pole B is greater than or equal to 30 meters but less than 50 meters. Only the pair of brackets n are activated when the detected object distance of the reference pole B is greater than or equal to 50 meters.

As can be understood from the foregoing, according to the automatic level 10 to which the present invention is directed, since the light receiving area to be used on each line sensor 21c is narrowed or enlarged depending upon the detected object distance of an object to be sighted through the telescope 8 of the automatic level 10 by varying the number of photodiodes to be used on each line sensor 21c, the influence of disturbance of light on the pair of line sensors 21c can be effectively reduced at any object distance. Focusing error during an autofocusing operation is greatly reduced, and, precise focusing can be achieved.

Although, in the above embodiment, the four predetermined focus measuring areas $Z_1$, $Z_2$, $Z_3$ and $Z_4$ are selectively used to correspond to the four divided sections of the object distance range (the first section (0 m<L≦10 m), the second section (10 m<L<30 m), the third section (30 m≦L<50 m), the fourth section (50 m≦L); "L" represents the object distance), other numbers of sets of predetermined focus measuring areas having different widths may be used (e.g., 2, 3, 5 or more than 5). For instance, if six sets of predetermined focus measuring areas are provided, these six focus measuring areas may be selectively used to correspond to six divided sections of the object distance range, or the focus measuring areas may be continuously narrowed or enlarged as the detected object distance increases or decreases, respectively.

Although one of the pairs of brackets i, j, k and n is activated as the AF frame zm through the LCD plate provided in the optical path of the telescope 8 in the above embodiment, the pairs of brackets i, j, k and n may be all printed on a transparent plate provided in the optical path of the telescope, or only one AF frame may be printed on the transparent plate.

Obvious changes may be made in the specific embodiment of the present invention described herein, such modifications being within the spirit and scope of the invention claimed. It is indicated that all matter contained herein is illustrative and does not limit the scope of the present invention.

For example, although the present invention has been described with reference to a level, the invention is not so limited. Rather, the invention may be utilized in a telescope of any type of surveying apparatus or equipment. Thus, the discussion of the level herein is merely a representative example of one of the types of machinery/equipment/apparatus in which the present invention can be advantageously utilized.

I claim:

1. A surveying apparatus having an autofocus system through which an object to be observed through a telescope of said surveying apparatus is brought into focus, said autofocus system comprising:

first and second image forming lenses forming first and second images of said object;

first and second line sensors, each having a plurality of light receiving elements defining first and second light receiving areas, said first and second images being respectively formed on said first and second light receiving areas through said first and second image forming lenses;

a focusing lens group provided in said telescope;

means for moving said focusing lens group along an optical axis of said telescope in accordance with data output from said first and second line sensors;

means for detecting a position of said focusing lens group;

means for selecting a number of said plurality of light receiving elements of each of said first and second line sensors responsive to said position of said focusing lens group detected by said detecting means; and means for controlling said moving means in accordance with data output from said number of said plurality of light receiving elements selected by said selecting means.

2. The surveying apparatus of claim 1, wherein said number of light receiving elements selected by said selecting means decreases as a distance to said object to be observed increases, said distance being detected in response to said position of said focusing lens group.

3. The surveying apparatus of claim 1, wherein said telescope comprises an objective lens group, said focusing lens group, a beam splitter, a reticle and an eyepiece in respective order from a side of said object to be observed, and wherein a portion of light passing through said objective lens group and said focusing lens group is reflected by said beam splitter towards said first and second image forming lenses and is split into first and second split images, said first and second split images being respectively formed on said first and second line sensors through said first and second image forming lenses.

4. The surveying apparatus of claim 3, wherein said autofocus system further comprises a condenser lens positioned between said beam splitter and said first and second image forming lenses.

5. The surveying apparatus of claim 1, wherein said autofocus system further comprises means for storing a plurality of sets of effective area defining data, each defining a different number of light receiving elements to be used, wherein, based upon said position of said focusing lens group detected by said detecting means, one set of said plurality of sets of effective area defining data is input to said selecting means, and wherein said selecting means selects said number of said plurality of light receiving elements in accordance with said one set of said plurality of sets of effective area defining data input to said selecting means.

6. The surveying apparatus of claim 3, wherein said telescope further comprises a horizontal plane establishing optical system, positioned between said focusing lens group and said beam splitter, for automatically establishing a horizontal plane of sight.

7. The surveying apparatus of claim 1, wherein said telescope further comprises an AF frame formed on a transparent plate positioned in an optical path of said telescope, said AF frame indicating a focus measuring area corresponding to a length of said number of said plurality of light receiving elements.

8. The surveying apparatus of claim 7, wherein said transparent plate is an LCD plate indicating said AF frame, said AF frame having a variable size based on said number of said plurality of light receiving elements selected by said selecting means.

9. The surveying apparatus of claim 8, wherein said AF frame varies in size to correspond to said length such that the size of said AF frame decreases as a distance between said telescope and said object to be observed increases, said object distance being detected based upon said position of said focusing lens group.

10. The surveying apparatus of claim 1, wherein each of said first and second line sensors is a multi-segment CCD sensor, and said plurality of light receiving elements comprise a plurality of photodiodes.

11. The surveying apparatus of claim 1, wherein said selecting means and said controlling means are provided in a single CPU.

12. A surveying apparatus having an autofocus system through which an object to be observed through a telescope of said surveying apparatus is brought into focus, wherein said telescope comprises an objective lens group, a focusing lens group, a reticle and an eyepiece in respective order from a side of said object, wherein said focusing lens group is moved along an optical axis to form an image of said object on said reticle, said image formed on said reticle being observable through said eyepiece, wherein said autofocus system comprises:

a beam splitter provided in an optical path between said focusing lens group and said reticle;

first and second image forming lenses forming first and second images of said object, said first and second image forming lenses each receiving light emitted from said beam splitter;

first and second line sensors, each having an array of light receiving elements defining a plurality of light receiving areas, said first and second images being respectively formed on said light receiving areas through said first and second image forming lenses;

means for moving said focusing lens group along said optical axis in accordance with data output from said first and second line sensors;

means for detecting a position of said focusing lens group;

means for selecting, from said array on each of said first and second line sensors, at least some of said light receiving elements for use in a focusing operation in which said moving means moves said focusing lens group so as to form said image of said object on said reticle, in response to said position of said focusing lens group detected by said detecting means; and means for controlling said moving means in accordance with data output from said selected light receiving elements.

* * * * *